(12) United States Patent
Hoefken et al.

(10) Patent No.: US 9,957,800 B2
(45) Date of Patent: May 1, 2018

(54) HORIZONTAL AGITATOR

(71) Applicant: INVENT UMWELT-UND VERFAHRENSTECHNIK AG, Erlangen (DE)

(72) Inventors: Marcus Hoefken, Erlangen (DE); Thomas Hagspiel, Postbauer-Heng (DE)

(73) Assignee: INVENT UMWELT-UND VERFAHRENSTECHNIK AG, Erlangen (DE)

( * ) Notice: Subject to any disclaimer, the term of this patent is extended or adjusted under 35 U.S.C. 154(b) by 793 days.

(21) Appl. No.: 14/389,788

(22) PCT Filed: Mar. 20, 2013

(86) PCT No.: PCT/EP2013/055838
§ 371 (c)(1),
(2) Date: Oct. 1, 2014

(87) PCT Pub. No.: WO2013/149834
PCT Pub. Date: Oct. 10, 2013

(65) Prior Publication Data
US 2015/0063998 A1 Mar. 5, 2015

(30) Foreign Application Priority Data
Apr. 4, 2012 (DE) .......... 10 2012 205 579

(51) Int. Cl.
 *F01D 5/12* (2006.01)
 *B01F 7/00* (2006.01)
 (Continued)

(52) U.S. Cl.
 CPC ............ *F01D 5/12* (2013.01); *B01F 7/00733* (2013.01); *B01F 7/06* (2013.01); *C02F 1/00* (2013.01);
 (Continued)

(58) Field of Classification Search
 CPC .... B01F 7/00733; B01F 7/00741; B01F 7/06; F01D 5/12; C01F 3/1284
 (Continued)

(56) References Cited

U.S. PATENT DOCUMENTS 4,581,182 A * 4/1986 Cramer ............... B01F 7/00741
 210/220
4,671,872 A 6/1987 Cramer et al.
 (Continued)

FOREIGN PATENT DOCUMENTS

DE 4120987 A1 * 1/1993 ............ A01C 3/026
DE 19845545 A1 8/1999
 (Continued)

OTHER PUBLICATIONS

Machine translation of DE4120987, accessed via https://worldwide.espacenet.com/, Jun. 29, 2017.*
 (Continued)

*Primary Examiner* — Walter D. Griffin
*Assistant Examiner* — Marc C Howell
(74) *Attorney, Agent, or Firm* — Manabu Kanesaka

(57) ABSTRACT

The invention relates to a horizontal agitator for producing a flow in a clarifier, a submersible motor (1) and a propeller (3) drivingly connected thereto forming an assembly unit (M), wherein a receiving portion (A) for removably attaching the assembly unit (M) is provided and can be supported on the bottom (Bo) of the clarifier, and wherein a guide for guiding the assembly unit (M) along a substantially vertical movement path between a surfacing position above a maximum nominal sewage level (N) defined for the clarifier and the receiving portion (A) is provided. In order to improve the efficiency of the horizontal agitator and to reduce complexity of manufacture, the guide is formed by at least one first cable (S) extending between the surfacing position and the receiving portion (A).

7 Claims, 5 Drawing Sheets

Figure 1:
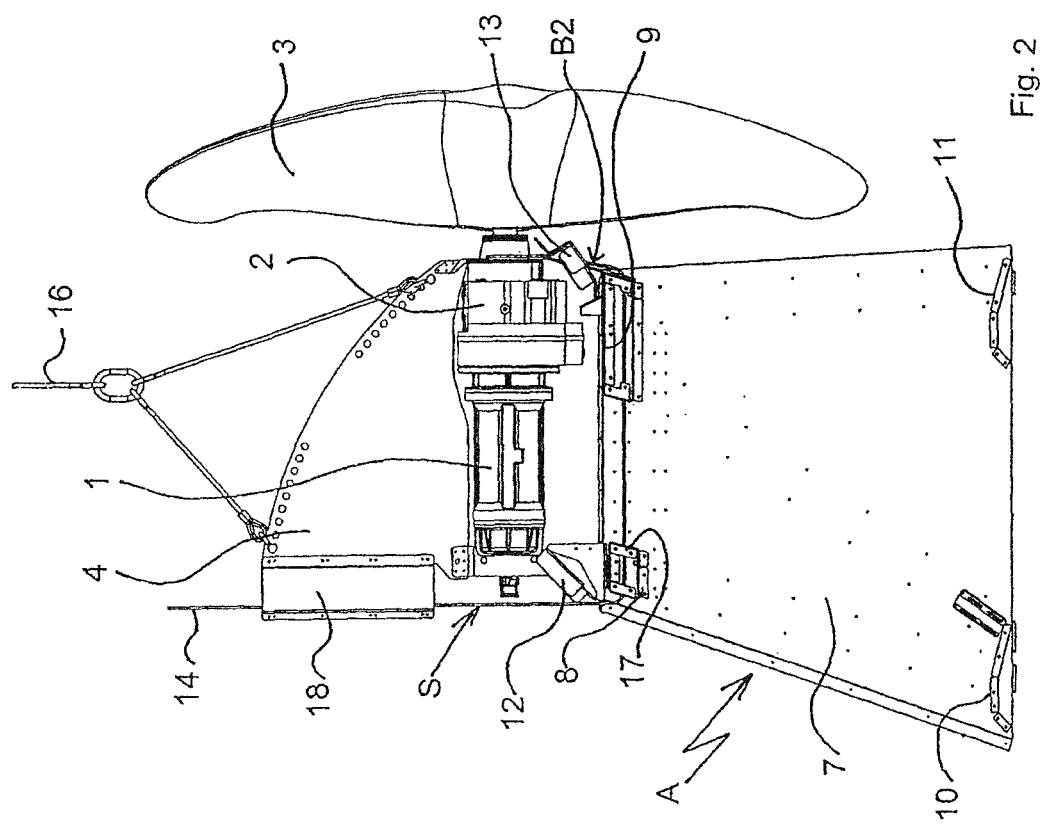

(51) Int. Cl.
*B01F 7/06* (2006.01)
*C02F 3/12* (2006.01)
*C02F 1/00* (2006.01)

(52) U.S. Cl.
CPC ...... *C02F 3/1284* (2013.01); *C02F 2001/007* (2013.01); *Y02W 10/15* (2015.05)

(58) Field of Classification Search
USPC ........................................................ 366/270
See application file for complete search history.

(56) References Cited

U.S. PATENT DOCUMENTS

| | | | |
|---|---|---|---|
| 5,338,116 A | 8/1994 | Sporl | |
| 2010/0096343 A1 | 4/2010 | Hoefken | |
| 2015/0259636 A1* | 9/2015 | Niederbacher | ..... B01F 7/00741 |
| | | | 435/289.1 |

FOREIGN PATENT DOCUMENTS

| | | | | |
|---|---|---|---|---|
| DE | 10319760 A1 * | 11/2004 | .......... | B01F 7/00741 |
| EP | 0757182 A1 * | 2/1997 | ........... | F04D 29/607 |
| JP | 2008-087862 A | 4/2008 | | |

OTHER PUBLICATIONS

Machine translation of EP0757182, accessed via https://worldwide.espacenet.com/, Jun. 29, 2017.*

Machine translation of DE10319760, accessed via https://worldwide.espacenet.com/, Jun. 29, 2017.*

PCT, "International Search Report for International Application No. PCT/EP2013/055838".

* cited by examiner

HORIZONTAL AGITATOR

The invention relates to a horizontal agitator according to the preamble of Patent Claim 1. The invention also relates to a method for lowering an assembly unit comprising a submersible motor with a propeller drivingly connected thereto.

A generic horizontal agitator is known for example from U.S. Pat. No. 4,671,872. Together with a propeller, a submersible motor forms an assembly unit. The assembly unit is guided in a vertically displaceable manner on a post, which is supported on a bottom of a clarifier and is attached to a wall of the clarifier. A cable winch is provided to lift and lower the assembly unit. With the known horizontal agitator, a flow directed from the submersible motor in the direction of the propeller is produced. The production of such a horizontal flow is not particularly efficient because the wall located in the suction region of the propeller counteracts an efficient horizontal recirculation of water received in the clarifier.

To overcome this disadvantage, a horizontal agitator likewise fitted to a post is known from WO 2008/101632 A1. The horizontal agitator is configured such that it produces a flow directed from the propeller to the submersible motor. In this case, neither the wall of the clarifier nor the post hinders a suction of sewage by means of the propeller. With the known horizontal agitator, it is possible to implement a horizontal recirculation of sewage in the clarifier with improved efficiency.

One object of the invention is to specify a horizontal agitator with improved efficiency. In accordance with a further objective of the invention, the horizontal agitator is to be producible as easily and cost-effectively as possible. Furthermore, it should also be possible to lift out from the clarifier an assembly unit formed from a submersible motor and a propeller fitted thereto for repair and/or maintenance purposes.

This object is achieved by the features of Claim 1. Advantageous embodiments of the invention will emerge from the features of Claims 2 to 12.

In accordance with the invention, it is proposed for the guide to be formed by at least one first cable extending between the surfacing position and the receiving portion. Consequently, the post provided in accordance with the prior art in order to guide the assembly unit can be spared. A flow resistance caused by the post is therefore also eliminated. The horizontal agitator according to the invention is characterised by a particularly efficient horizontal recirculation of sewage in a clarifier.

In accordance with a first embodiment, the first cable is guided around a first return arrangement provided on the receiving portion, and a first end of the first cable is attached to the assembly unit. A guide provided on the assembly unit advantageously surrounds the first cable. It is thus possible to guide the assembly unit along the first cable in an assembly position on the receiving portion.

To move the assembly unit along the first cable, a second cable is advantageously provided, of which the second end is attached to the assembly unit. The second cable enables a lifting and/or lowering of the assembly unit, wherein this is guided advantageously along the first cable by means of the guide provided on the assembly unit.

In accordance with a further embodiment, the first end of the first cable is attached at a lower attachment point on the assembly unit, and the second end of the second cable is attached at least at one upper attachment point of the assembly unit. The upper attachment point is advantageously offset in relation to a centre of gravity of the assembly unit, such that the assembly unit suspended at least at one upper attachment point adopts a sloping position, in which an axis of the propeller runs in a manner sloping with respect to the bottom of the clarifier. Due to the proposed inclined position in the suspended state, it is particularly easy to couple the assembly unit to the receiving portion.

The second end of the second cable is advantageously attached removably at the upper attachment point of the assembly unit. For this purpose, a hook for example can be fitted at the second end of the second cable, and an eyelet or a bracket or the like corresponding to said hook can be fitted at the upper attachment point of the assembly unit. It is thus possible, after lowering the assembly unit onto the receiving portion, to detach the second cable from the assembly unit and to remove said cable from the clarifier. Consequently, a flow resistance caused by the second cable can be avoided, and the efficiency of the recirculation of the sewage received in the clarifier, said recirculation being caused by the horizontal agitator, can be improved.

In order to hang for example a hook fitted at the second end of the second cable, a rod or the like can be provided, to which the hook is attached, for example removably, and with which the hook can be hung in the eyelet provided on the assembly unit or in the bracket provided thereon.

In accordance with a further embodiment, a third end of the first cable is received on a first winch provided above the maximum nominal sewage level and a fourth end of the second cable is received on a second winch provided above the maximum nominal sewage level. By means of the winches, which are advantageously coupled to one another with a reversing gearing arranged therebetween, the assembly unit can be lifted and lowered. The winches can be driven for example by means of an electric motor.

In accordance with a particularly advantageous embodiment, the first and the second cable are combined to form a circulating cable, which is guided above the surfacing position around a second return arrangement, preferably a third winch. For example, the third winch can be driven by an electric motor.

The first and the second winch or the second return arrangement are/is advantageously attached to a bridge or frame provided in the region of the surfacing position. The length of the cable or of the cables can thus be kept low. This simplifies the course of movement and makes the proposed horizontal agitator particularly reliable.

In accordance with a further embodiment, the assembly unit has a first coupling arrangement, wherein the receiving portion is provided with a second coupling arrangement corresponding to the first coupling arrangement, such that the assembly unit can be coupled removably to the receiving portion by cooperation of the first and second coupling arrangement. The first and the second coupling arrangement are advantageously formed such that a coupling or decoupling is possible by a tension on the first or second cable or, in the case of the use of a circulating cable, by tension on a first or second branch of the circulating cable. A form-fitting connection between the receiving portion and the assembly unit is preferably produced with the coupling arrangement. The form-fitting connection can be supplemented and safeguarded by a force-locked connection caused by the operation of the horizontal agitator.

The first coupling arrangement may have a first coupling element, which, during the coupling process, engages with a second coupling element of the second coupling arrangement, said second coupling element being provided at the receiving portion. The first and the second coupling elements can be configured in particular such that the inclined assembly unit engages with the receiving portion when lowered thereonto.

In accordance with a further embodiment, the first coupling arrangement has a third coupling element, which, during the coupling process, engages with a fourth coupling element of the second coupling arrangement, said fourth coupling element being provided on the receiving portion, wherein a clamped or latched connection is achieved.

Figure 2:
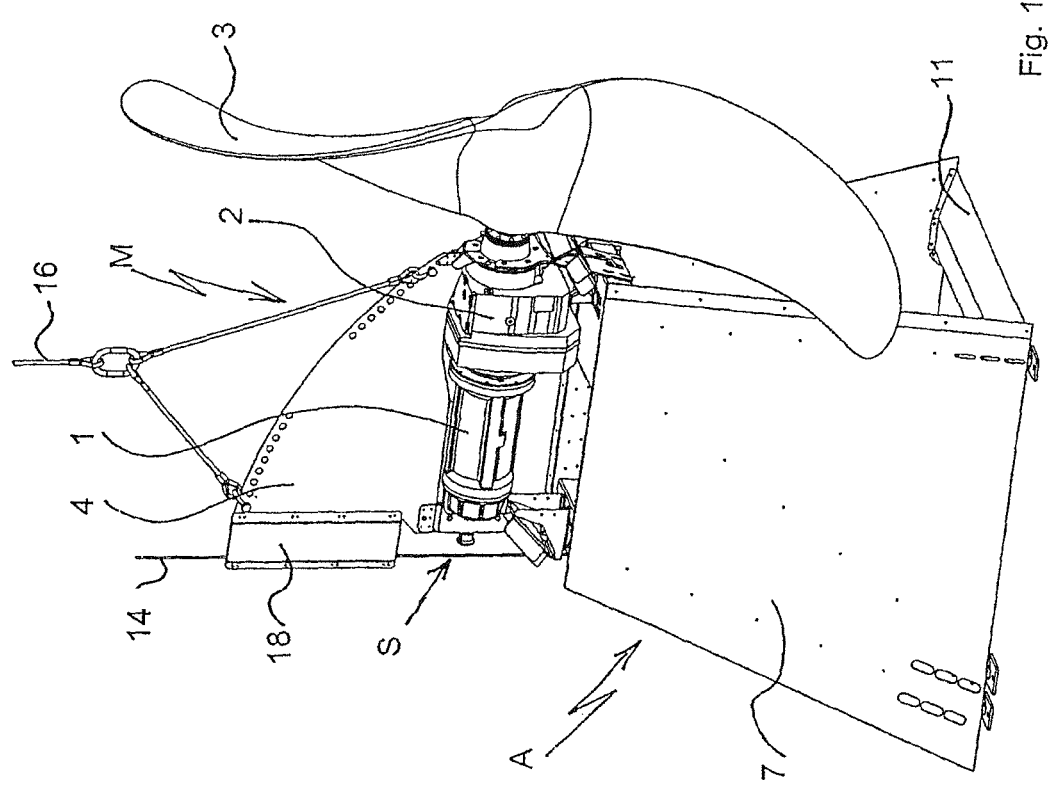
Figure 4:
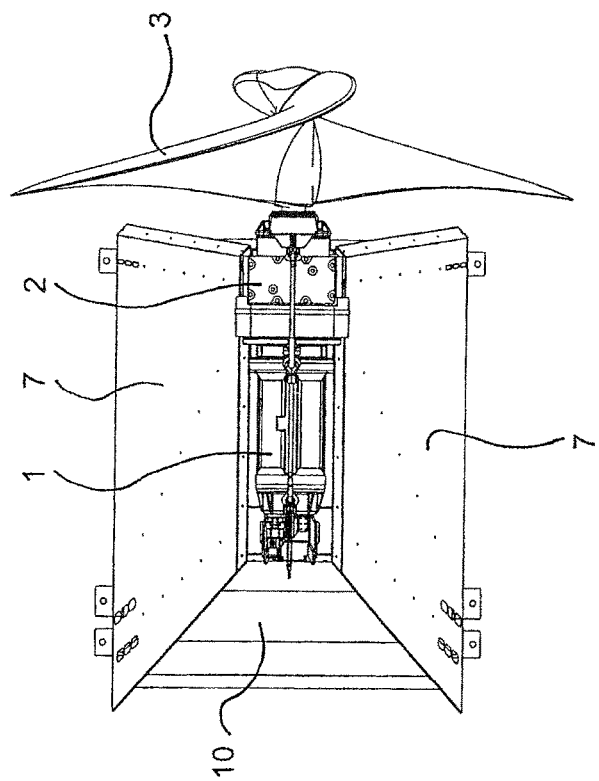
Figure 3:
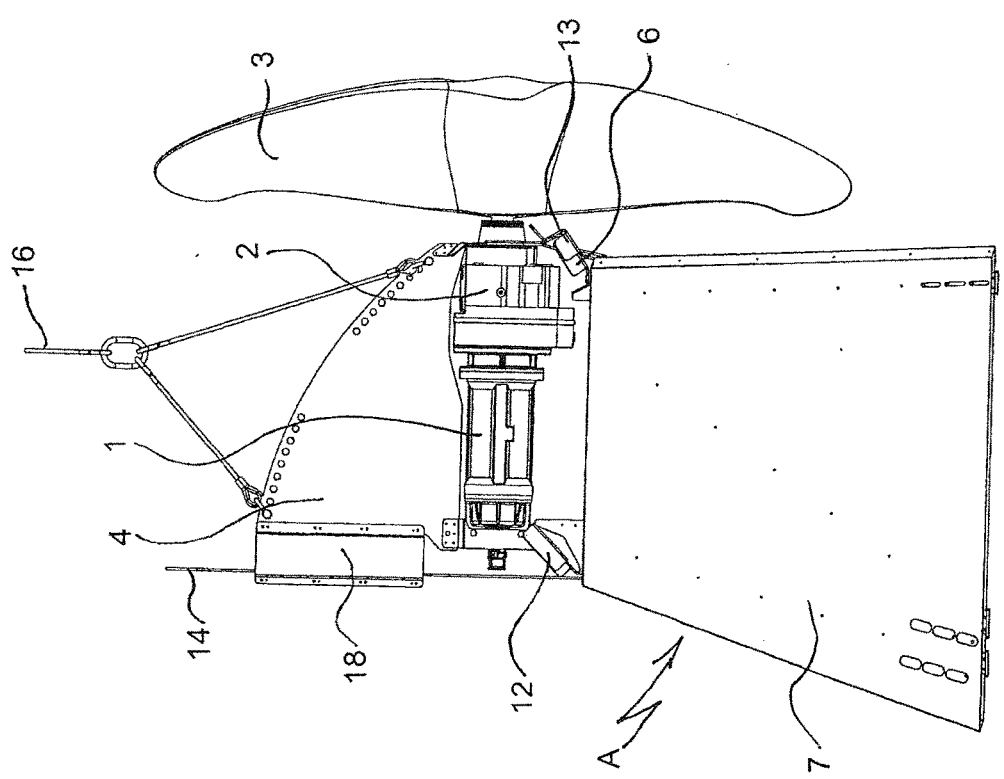
Figure 5:
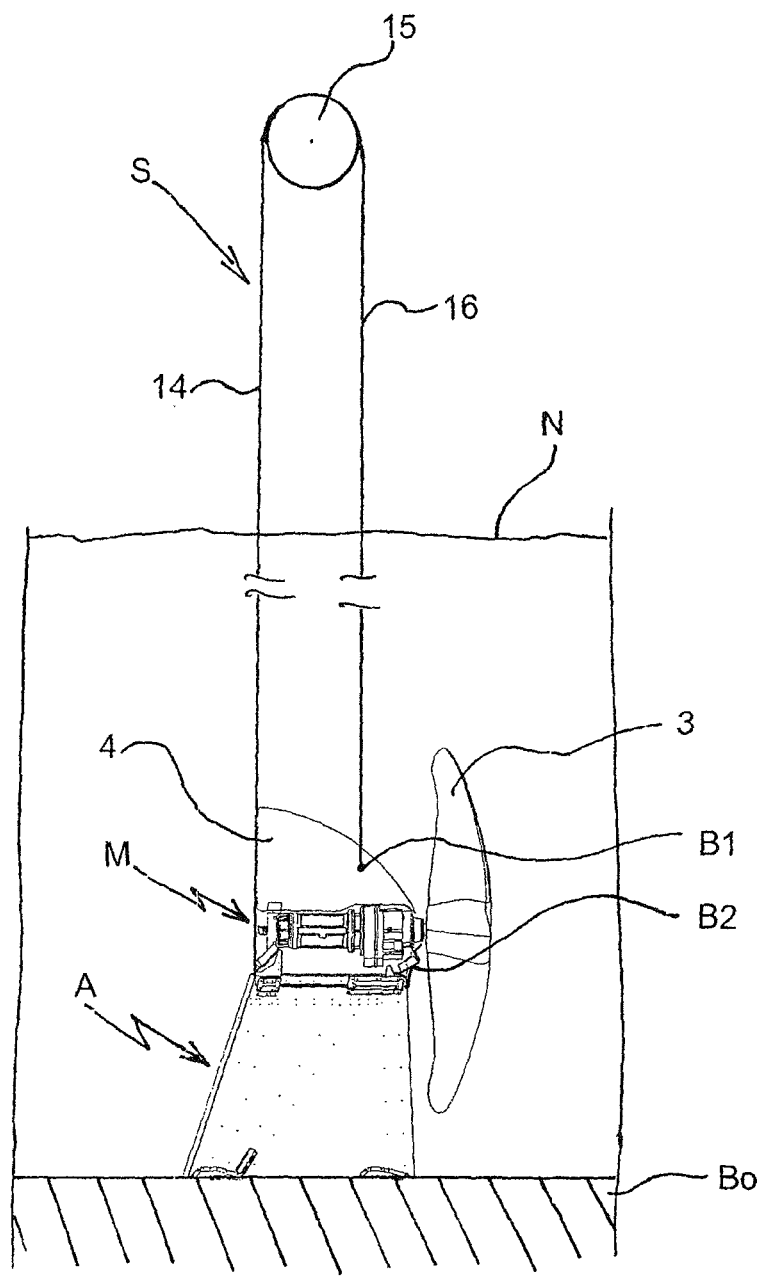
Figure 6A:
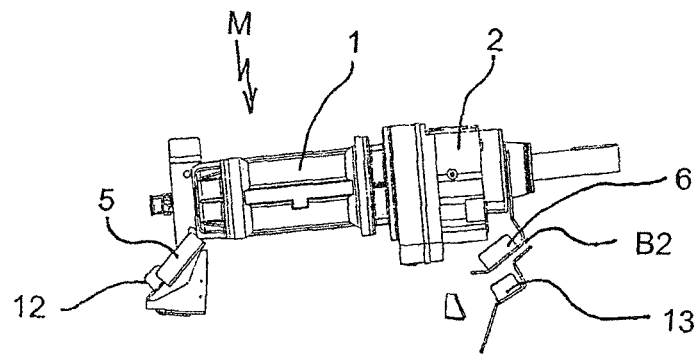
Figure 6B:
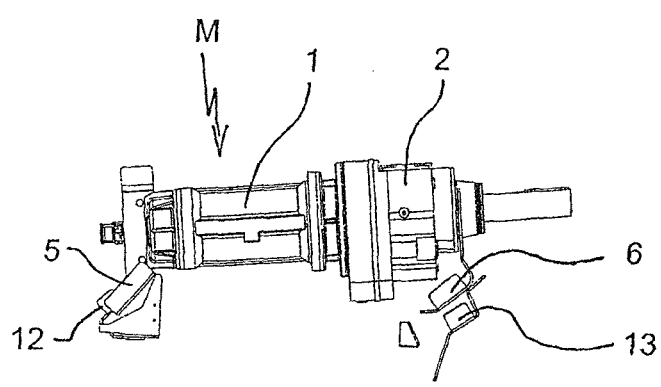
Figure 6C:
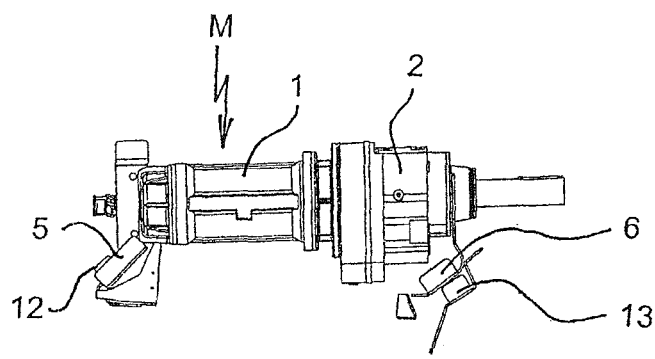
Figure 6D:
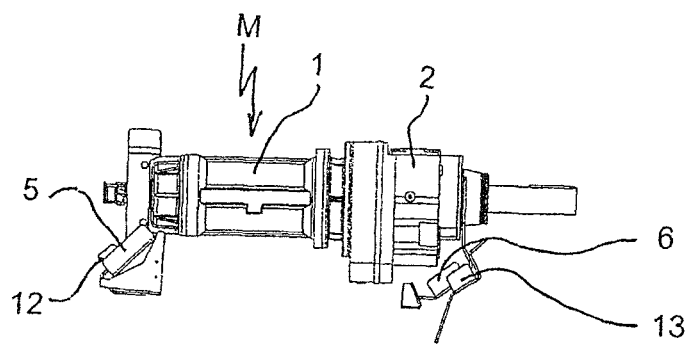
Figure 7:
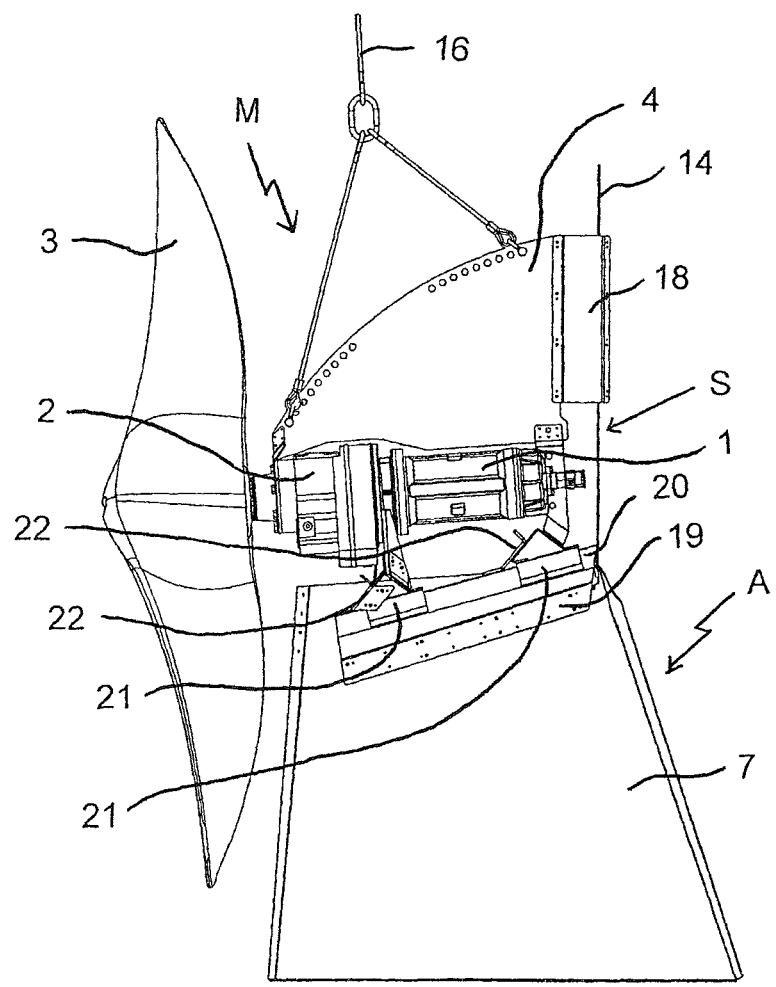

An exemplary embodiment of the invention will be explained in greater detail hereinafter on the basis of the drawings, in which:

FIG. 1 shows a perspective view of a horizontal agitator,
FIG. 2 shows a sectional view according to FIG. 1,
FIG. 3 shows a side view according to FIG. 1,
FIG. 4 shows a plan view according to FIG. 1,
FIG. 5 shows the horizontal agitator according to FIG. 2 with cable winch,
FIG. 6a-d show the course of movement when coupling the assembly unit, and
FIG. 7 shows a sectional view through a further horizontal agitator.

The horizontal agitator shown in FIGS. 1 to 5 has an assembly unit denoted generally by reference sign M. The assembly unit M comprises a submersible motor 1, which drives a propeller 3 via a gearing 2 in such a way that a horizontal flow directed from the propeller 3 in the direction of the submersible motor 1 can be produced. A first flow guide element 4 extends from the submersible motor 1 in the vertical direction. As can be seen in particular from FIG. 6a, the assembly unit M has a first coupling arrangement. The first coupling arrangement comprises a first coupling element 5 extending in the submersible motor 1 and a third coupling element 6 extending from the gearing 2.

A receiving portion is denoted in FIGS. 1 to 5 by the reference sign A, at which receiving portion two plate-like second flow guide elements 7 are interconnected by means of a first carrier plate 8 and a second carrier plate 9. On the bottom side, the second flow guide elements 7 are interconnected via a first connection element 10 and a second connection element 11. The first 8 and the second carrier plate 9 carry a second coupling arrangement. The second coupling arrangement comprises a second coupling element 12 extending from the first carrier plate and a fourth coupling element 13 extending from the second carrier plate. Reference sign 14 denotes a first branch of a circulating cable S, which extends between a first idler pulley 15 and the receiving portion A. A second branch 16 extends from the first idler pulley 15 to the upper attachment points B1 on the assembly unit M. The upper attachment points B1 are advantageously located on the first flow guide element 4. The first branch 14 of the cable S is guided by a first guide 17 on the receiving portion A, which guide passes through the first 8 and the second carrier plate 9. A further end of the cable S is attached at a lower attachment point B2 on the assembly unit M in the region of the third coupling element 6. The assembly unit M is guided along the first branch 14 by means of a second guide 18 fitted on the first flow-guide element. The second guide 18 may be a slot guide surrounding the first branch 14, eyebolts, or the like. With use of the slot guide shown in the figures, the assembly unit M can pivot from a horizontal position (see FIG. 6a) into an inclined position (see FIG. 6d). The first guide 17 is advantageously a bent pipe (not shown here) passing through the first 8 and the second carrier plate 9. Alternatively, second idler pulleys (not shown here) can also be provided.

The first idler pulley 15 is mounted above a nominal sewage level on a bridge or a frame (not shown here). By way of example, it can be driven by means of an electric motor. A bottom of a clarifier is denoted in FIG. 5 by the reference sign Bo.

The horizontal agitator functions as follows:

To lower an assembly unit M located above the nominal sewage level N, the circulating cable S is moved in a clockwise direction about the first idler pulley 15. The assembly unit M consequently lowers in the direction of the receiving portion A, wherein it is guided along the first branch 14 by means of the second guide 18. A further guide is implemented by the second branch 16.

An upper attachment point B1 on the assembly unit M is selected such that the assembly unit M adopts an inclined position when lowering. As can be seen in particular from FIG. 6a, the inclined position is selected such that, during the lowering, the first coupling element 5 first engages with the second coupling element 12 provided on the receiving portion A. By exerting a tensile stress by means of the cable S onto the lower attachment point B2, the third coupling element is then brought into engagement with the fourth coupling element 13 fitted on the receiving portion A. In the coupled state, which is shown in FIG. 6d, the assembly unit M adopts a substantially horizontal position. In this state, the third coupling element 6 is latched with the fourth coupling element 13. The assembly unit M is decoupled from the receiving portion A in the reverse order by moving the circulating cable S against the clockwise direction about the first idler pulley 15.

In the case of the further horizontal agitator shown in FIG. 7, the second flow guide elements 7 are interconnected by means of a single third connection element 19. The third connection element 19 has, on the upper side thereof facing the assembly unit M, a profile rail 20 with a trapezoidal or V-shaped profile (not shown here).

Two fifth coupling elements 21 are fitted on the assembly unit M, the profile of said coupling elements corresponding to the profile of the profile rail 20 in such a way that the fifth coupling elements 21 can be fitted in a substantially form-fitting manner on the profile rail 20.

Reference sign 22 denotes sixth coupling elements fitted on the profile rail 20. The third connection element 19 receiving the profile rail 20 is attached to the second flow guide elements 7 in an inclined manner sloping downwardly in the direction of the propeller 3.

During the lowering, the assembly element M is guided along the first branch 14 by means of the second guide 18 such that the fifth coupling elements 21 fit onto the profile rail 20. Due to the inclination of the profile rail 20 and also a tensile stress that can be produced with the first branch 14, the fifth coupling elements 21 are forced into abutment with the sixth coupling elements 22. The horizontal agitator is operated in such a way that a force is always exerted with the propeller 3 onto the assembly unit M and forces the fifth 21 and the sixth coupling elements 22 against one another.

The proposed horizontal agitator can be produced with low outlay. In particular, it is possible to dispense with the provision of a vertical column or of a vertical pillar for guiding the assembly unit M. With the proposed horizontal agitator, a horizontal flow can be produced in a clarifier in a particularly efficient manner.

LIST OF REFERENCE SIGNS 1 submersible motor
2 gearing 3 propeller
4 first flow guide element
5 first coupling element
6 third coupling element
7 second flow guide element
8 first carrier plate
9 second carrier plate
10 first connection element
11 second connection element
12 second coupling element
13 fourth coupling element
14 first branch
15 first idler pulley
16 second branch
17 first guide
18 second guide
19 third connection element
20 profile rail
21 fifth coupling element
22 sixth coupling element
A receiving portion
B1 upper attachment point
B2 lower attachment point
Bo bottom
M assembly unit
N nominal sewage level
S cable

The invention claimed is:

1. A horizontal agitator for producing a flow in a clarifier, comprising:
a submersible motor;
a propeller drivingly connected to the submersible motor to form an assembly unit;
a receiving portion for removably attaching to the assembly unit provided and supported on a bottom of the clarifier, and
a guide for guiding the assembly unit along a substantially vertical movement path between a surfacing position above a maximum nominal sewage level defined for the clarifier and the receiving portion,
wherein the guide is formed by at least one first cable extending between the surfacing position and the receiving portion,
the first cable is guided about a first return arrangement provided on the receiving portion,
an end of the first cable is attached to the assembly unit,
a guide provided on the assembly unit surrounds the first cable,
in order to move the assembly unit along the first cable, a second cable is provided,
an end of the second cable is attached to the assembly unit, and
the first and the second cable are combined to form a circulating cable, which is guided above the surfacing position about a second return arrangement.

2. The horizontal agitator according to claim 1, wherein the end of the first cable is attached at a lower attachment point on the assembly unit, and
the end of the second cable is attached at least at one upper attachment point on the assembly unit.

3. The horizontal agitator according to claim 2, wherein the upper attachment point is offset in relation to a centre of gravity of the assembly unit, such that the assembly unit suspended at least at one upper attachment point adopts a sloping position, in which an axis of the propeller runs in a manner sloping with respect to the bottom of the clarifier.

4. The horizontal agitator according to claim 1, wherein the assembly unit has a first coupling arrangement, and the receiving portion is provided with a second coupling arrangement corresponding to the first coupling arrangement, such that the assembly unit is releasably coupled to the receiving portion by cooperation of the first coupling arrangement and the second coupling arrangement.

5. The horizontal agitator according to claim 4, wherein the first coupling arrangement has a first coupling element, which, during a coupling process, engages with a second coupling element of the second coupling arrangement, said coupling element being provided on the receiving portion.

6. The horizontal agitator according to claim 5, wherein the first coupling arrangement has a third coupling element, which, during the coupling process, engages with a fourth coupling element of the second coupling arrangement, said fourth coupling element being provided on the receiving portion, wherein a clamped or latched connection is produced.

7. The horizontal agitator according to claim 1, wherein the second return arrangement is a winch.

* * * * *